US011584264B2

(12) United States Patent
Runde et al.

(10) Patent No.: US 11,584,264 B2
(45) Date of Patent: Feb. 21, 2023

(54) LONG RAIL ASSEMBLY WITH SIDE OPENING FOR VEHICLE SEAT ADJUSTMENT

(71) Applicant: Magna Seating Inc, Aurora (CA)

(72) Inventors: David M. Runde, Ortonville, MI (US); Omar D. Tame, Punta Gorda, FL (US)

(73) Assignee: MAGNA SEATING INC, Aurora (CA)

( * ) Notice: Subject to any disclaimer, the term of this patent is extended or adjusted under 35 U.S.C. 154(b) by 701 days.

(21) Appl. No.: 16/597,308

(22) Filed: Oct. 9, 2019

(65) Prior Publication Data

US 2020/0108737 A1 Apr. 9, 2020

Related U.S. Application Data

(60) Provisional application No. 62/743,216, filed on Oct. 9, 2018.

(51) Int. Cl.
*B60N 2/07* (2006.01)
*B60N 2/08* (2006.01)
*B60N 2/02* (2006.01)

(52) U.S. Cl.
CPC ......... *B60N 2/0715* (2013.01); *B60N 2/0232* (2013.01); *B60N 2/0707* (2013.01); *B60N 2/0825* (2013.01); *B60N 2002/024* (2013.01); *B60N 2002/0236* (2013.01)

(58) Field of Classification Search
CPC .. B60N 2/0715; B60N 2/0232; B60N 2/0707; B60N 2/0825; B60N 2002/0236; B60N 2002/024
USPC ...................................................... 296/65.14
See application file for complete search history.

(56) References Cited

U.S. PATENT DOCUMENTS

| | | | | |
|---|---|---|---|---|
| 3,977,725 A * | 8/1976 | Tengler | .................. | B60R 22/26 297/468 |
| 4,395,011 A * | 7/1983 | Torta | ........................ | B60N 2/10 297/335 |
| 5,348,261 A * | 9/1994 | Nini | ...................... | B60N 2/0825 248/424 |
| 5,407,166 A * | 4/1995 | Pilarski | ................ | B60N 2/0705 296/65.14 |
| 5,800,015 A * | 9/1998 | Tsuchiya | ................ | B60N 2/085 248/65 |
| 6,488,250 B1 * | 12/2002 | Munch | ................. | B60N 2/0747 297/344.1 |
| 6,691,971 B2 | 2/2004 | Yamada et al. | | |
| 7,331,558 B2 | 2/2008 | Jeong | | |

(Continued)

FOREIGN PATENT DOCUMENTS

KR 100513577 9/2009
WO 2005068247 7/2005

*Primary Examiner* — Hilary L Gutman
(74) *Attorney, Agent, or Firm* — Miller Canfield

(57) ABSTRACT

A long rail assembly attached to a vehicle floor for repositioning vehicle seats in a vehicle between a plurality of seating positions. The long rail assembly includes a fixed long rail having a C-shaped cross-section in profile and an elongated opening in a side wall of the long rail, a power rail drive module configured to travel along an interior of the long rail and having at least one striker extending laterally away from the rail drive module through the elongated opening in the side wall of the long rail, and a vehicle seat having at least one leg releasably coupled to the at least one striker by a seat latch assembly.

22 Claims, 14 Drawing Sheets

(56) References Cited

U.S. PATENT DOCUMENTS

| | | | |
|---|---|---|---|
| 8,844,891 B2 | 9/2014 | Yamada et al. | |
| 9,114,729 B2 | 8/2015 | Kinzer et al. | |
| 10,011,195 B2 | 7/2018 | Kume et al. | |
| 2011/0095161 A1* | 4/2011 | Hayashi | B60N 2/0818 |
| | | | 248/430 |
| 2018/0194248 A1* | 7/2018 | Quast | B60N 2/20 |
| 2019/0084453 A1* | 3/2019 | Petit | B60N 2/0818 |
| 2020/0207242 A1* | 7/2020 | Petit | B60N 2/4221 |
| 2021/0129710 A1* | 5/2021 | Petit | B60N 2/0875 |

\* cited by examiner

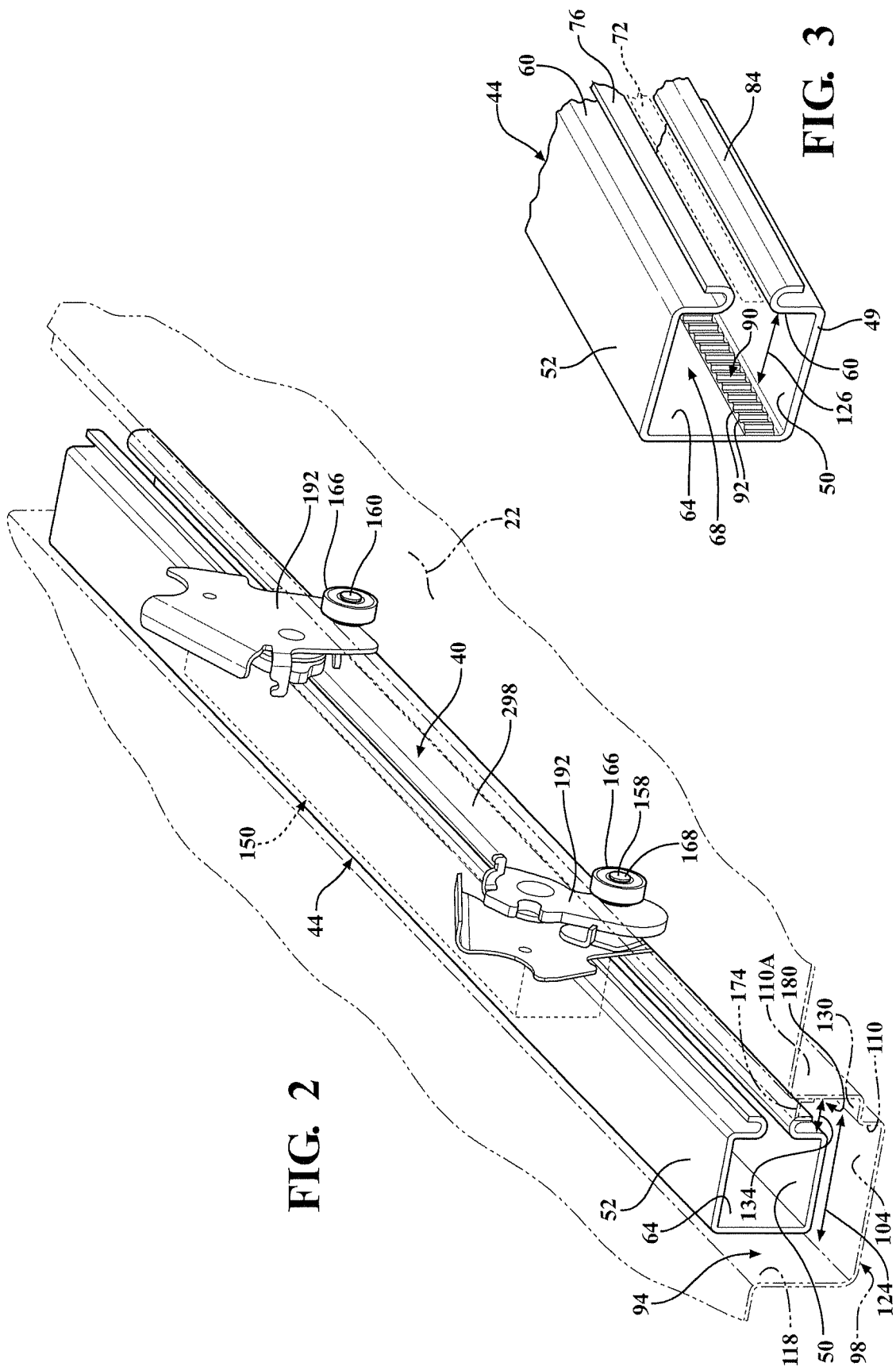

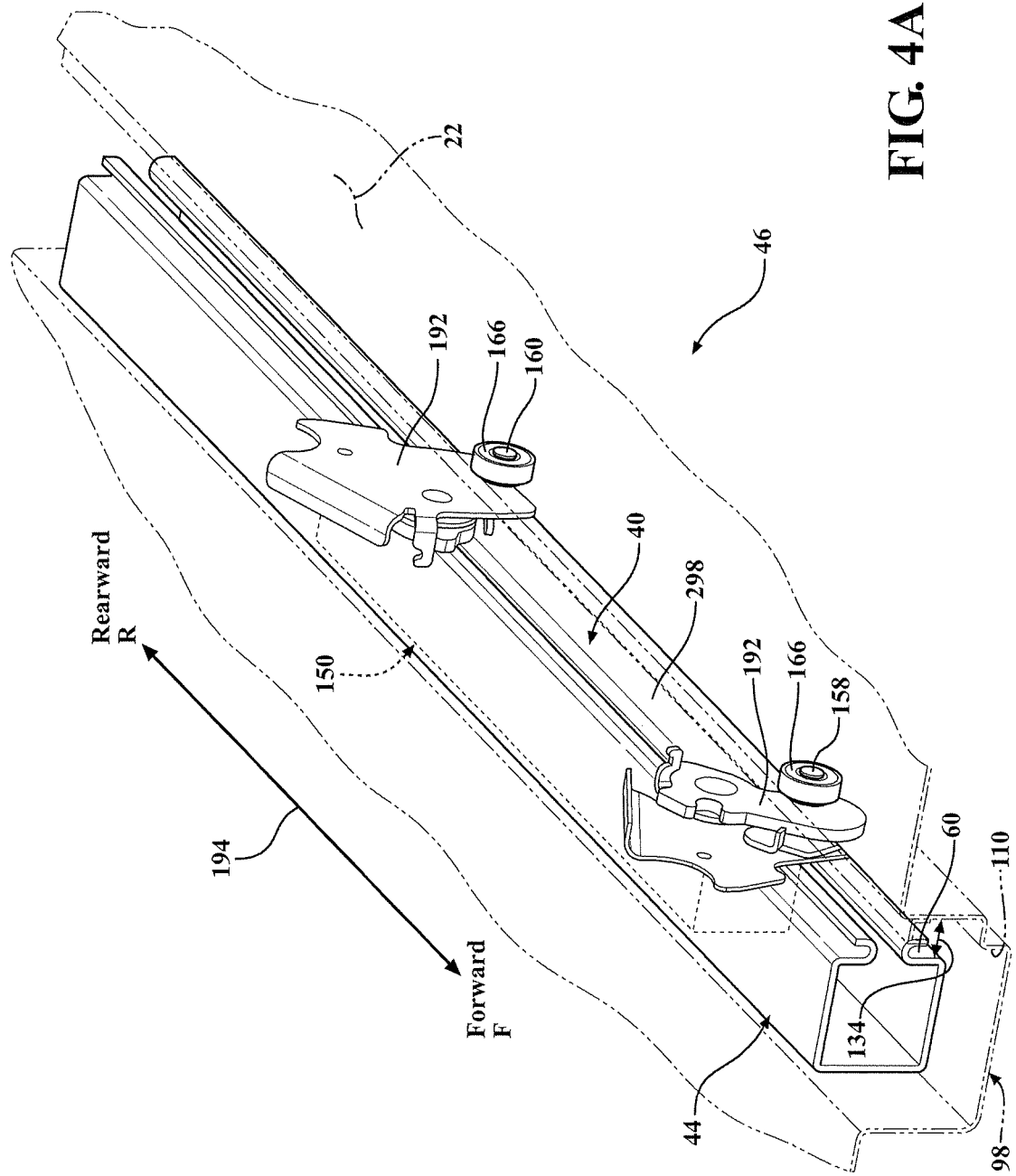

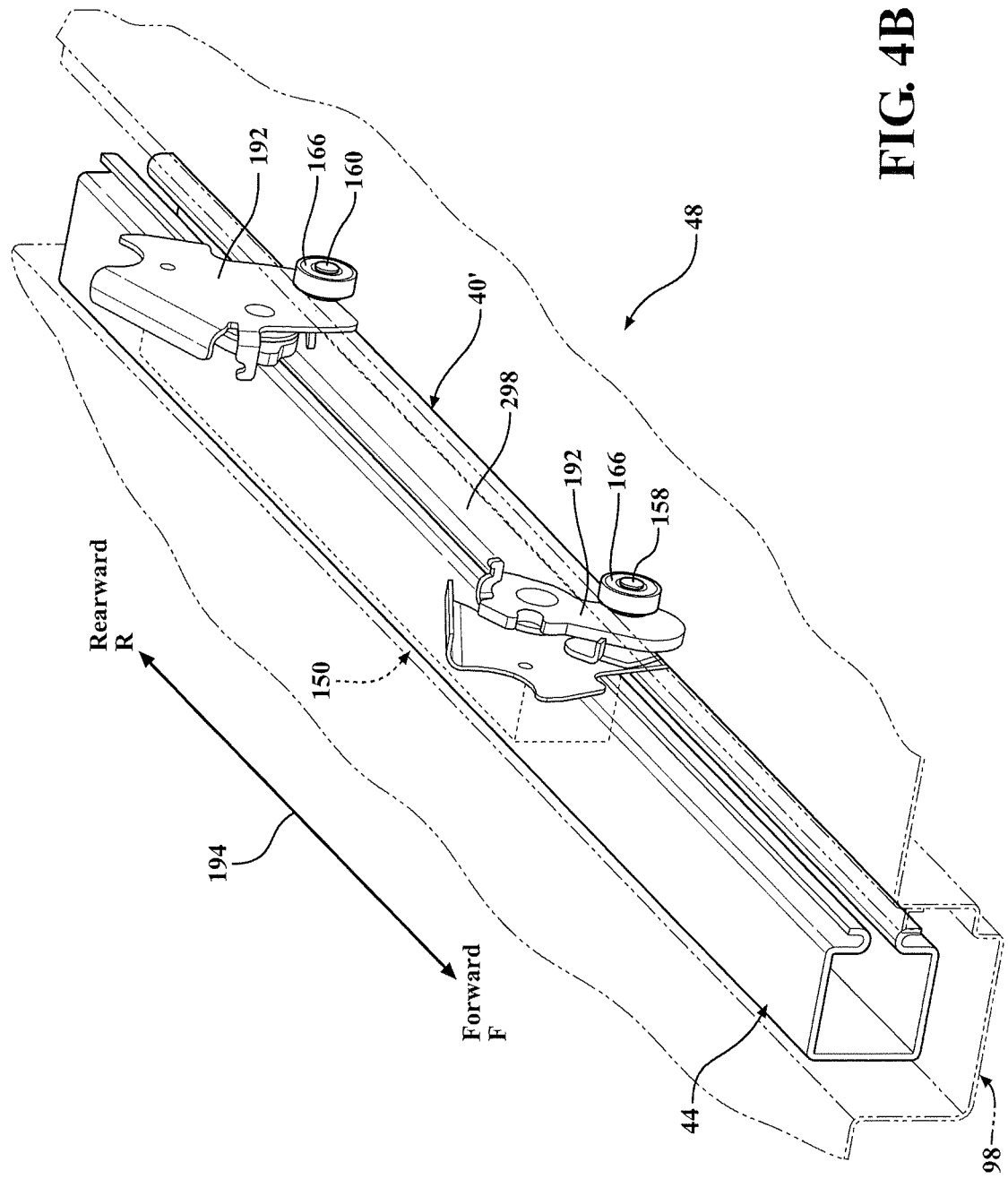

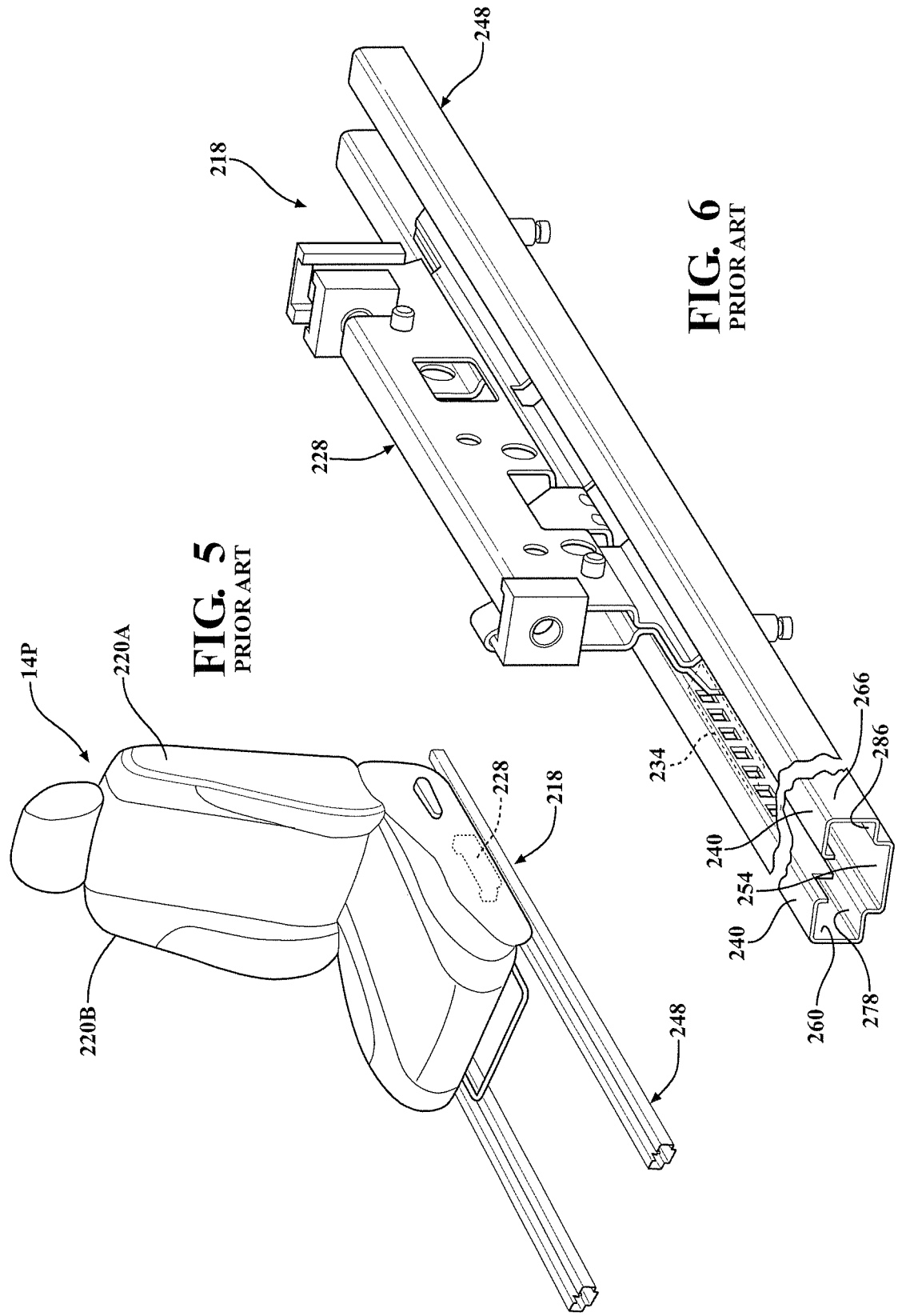

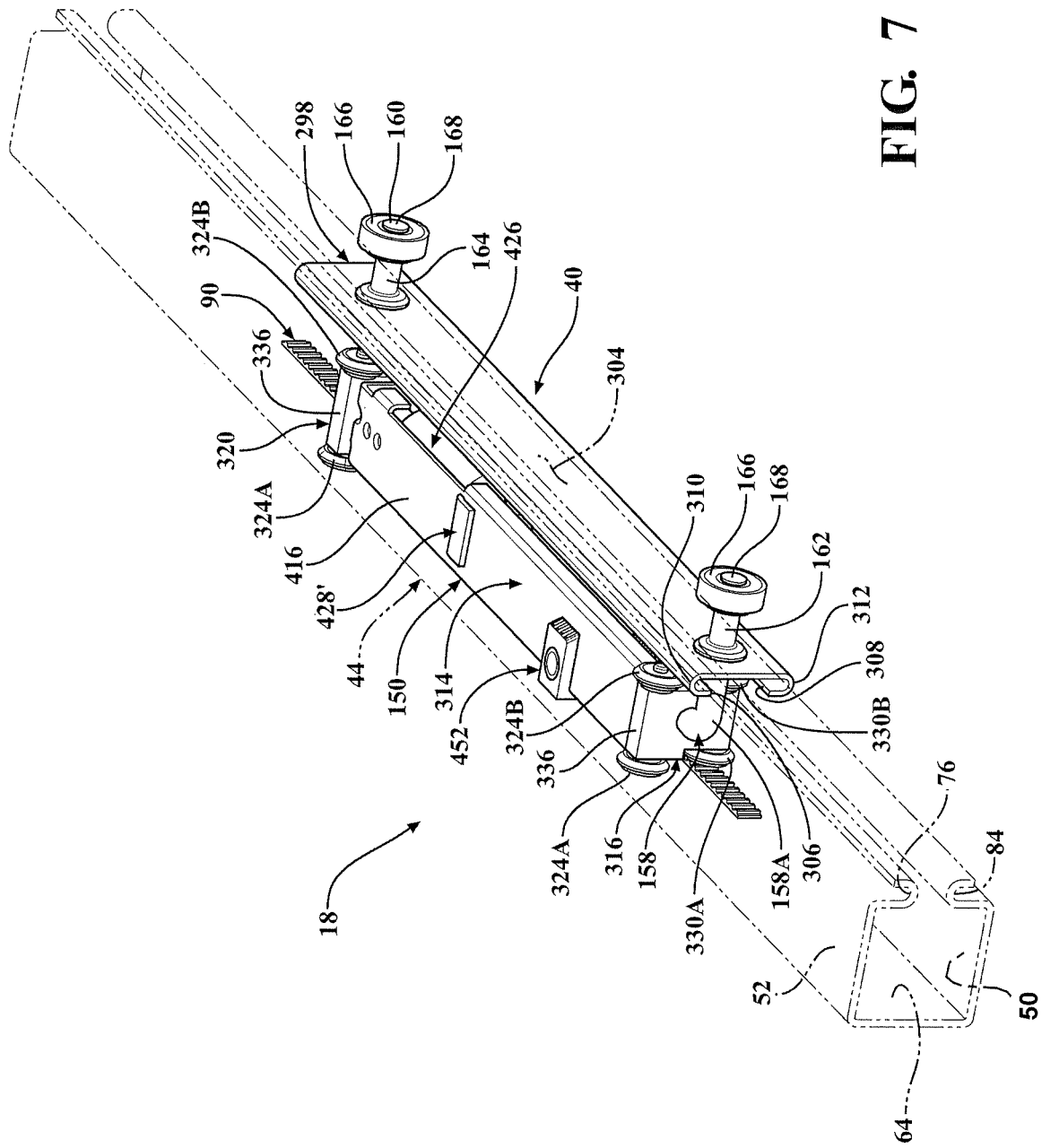

LONG RAIL ASSEMBLY WITH SIDE OPENING FOR VEHICLE SEAT ADJUSTMENT

CROSS-REFERENCE TO RELATED APPLICATIONS

This application claims priority to U.S. Provisional Application 62/743,216, filed on Oct. 9, 2018, the disclosure of which is hereby incorporated by reference in its entirety.

BACKGROUND OF THE INVENTION

1. Field of the Invention

The present invention relates to a drive mechanism that supports a vehicle seat and is configured to travel along a long rail when the vehicle seat is repositioned to a different location along the long rail within a vehicle. More particularly, the invention relates to a long rail having a side opening wherein a power rail drive mechanism travels along the interior of the long rail to reposition the vehicle seat to a different position along the long rail.

2. Description of Related Art

Various slide mechanisms are known for repositioning a vehicle seat along a long rail in a vehicle. Known seat slide mechanisms are disclosed in U.S. Pat. Nos. 10,011,195 and 8,844,891, wherein a vehicle seat is coupled to a movable rail that is slidable within a C-shaped fixed rail having an upwardly-facing longitudinal opening. The movable rail has a plurality of rolling elements on opposing sides of the movable rail that are configured to travel along a track on opposing sides of the C-shaped fixed rail. The movable rail has a connecting portion that extends through the upwardly-facing longitudinal opening in the fixed rail.

Another known seat slide mechanism is disclosed in W.O. Publication 2005/068247 wherein a vehicle seat is coupled to a movable rail that is slidable within an omega-shaped fixed rail having an upwardly-facing longitudinal opening. The movable rail has horizontally-extending tabs on opposing sides of the movable rail that are configured to travel along a track on opposing sides of the omega-shaped fixed rail. The movable rail has a connecting portion that extends through the upwardly-facing longitudinal opening in the fixed rail.

All of these known seat slide mechanisms are susceptible to contamination and/or debris entering the fixed rail and the movable rail due to the open cross-section of the fixed rail. Further, all of these seat slide mechanisms are manually positionable only along the fixed rail since they lack a power rail drive mechanism.

It is desirable, therefore, to have a fixed rail lacking an upwardly-facing longitudinal opening to reduce the amount of contamination and/or debris that enters the fixed rail. Further, it is desirable to provide a power-driven mechanism that is configured to automatically reposition the movable rail along the fixed rail. Finally, it is desirable for the power-driven mechanism to be contained within the long rail.

SUMMARY OF THE INVENTION

A long rail assembly is provided for repositioning vehicle seats in a vehicle. The long rail assembly includes a fixed long rail having a side opening, a power rail drive module configured to travel along an interior of the long rail and having at least one striker extending laterally away from the rail drive module and through the side opening in the long rail, and a vehicle seat having at least one leg releasably coupled to the at least one striker by a seat latch assembly.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a perspective view of a portion of a long rail including a rail drive assembly coupled with seat latch assemblies according to one embodiment of the present invention;

FIG. 3 is a perspective view of a portion of the long rail of FIG. 2 illustrating a gripping surface according to one embodiment of the present invention;

FIG. 4A is a perspective view of the portion of the long rail including the rail drive assembly and seat latch assemblies of FIG. 2 with the rail drive assembly in a first seat position according to one embodiment of the present invention;

FIG. 4B is a perspective view of the portion of the long rail including the rail drive assembly and seat latch assemblies of FIG. 2A with the rail drive assembly in a second seat position according to one embodiment of the present invention;

FIG. 5 is a perspective view of a known vehicle seat slidably coupled to a long rail;

FIG. 6 is a perspective view of a known seat sliding device coupled with a long rail;

FIG. 7 is a perspective view of the portion of the long rail including the rail drive assembly of FIG. 2 illustrating the rail drive assembly within the long rail according to one embodiment of the present invention;

DETAILED DESCRIPTION OF THE EMBODIMENTS

FIGS. 1-4 and 7-17 illustrate a long rail assembly with a side opening and having a power drive module within the long rail for vehicle seat adjustment according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
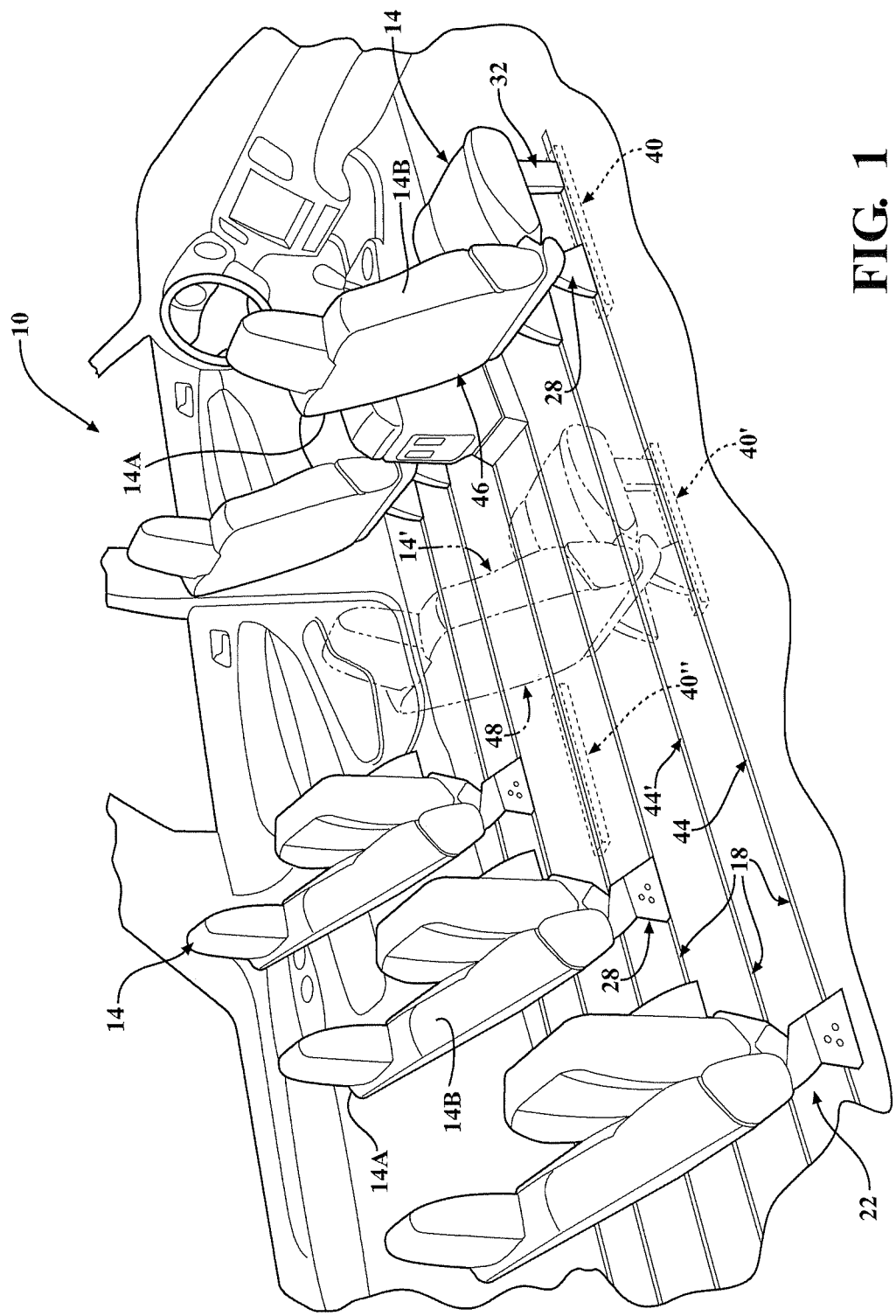
FIG. 1 is a fragmentary perspective view of a vehicle having vehicle seats coupled to a long rail assembly according to one embodiment of the present invention.

FIG. 1 illustrates an interior of a vehicle 10 having a plurality of vehicle seats 14 connected to a long rail system 18 attached to a vehicle floor 22 according to one embodiment of the present invention. As will be described further below, each vehicle seat 14 is supported by at least one leg 28 on opposing sides 14A, 14B of the vehicle seat 14, and optionally, front and rear legs 32, 28 on opposing sides 14A, 14B of the vehicle seat 14. The vehicle seat legs 32, 28 on each side 14A, 14B of the vehicle seat 14 are releasably coupled with a long rail drive assembly 40. Each long rail drive assembly 40 travels along a fixed long rail 44 that is attached to the vehicle floor 22. The long rails 44 can extend for any length suitable for an intended application. Each vehicle seat 14 travels along a pair of long rails 44, 44' when the vehicle seat 14 is repositioned. The vehicle seat 14 is illustrated in a first seating position 46 and can be translated along the long rails 44 to a second desired seating position 48 (shown in phantom as vehicle seat 14'). The long rails 44 can have a plurality of selectable seating positions 46, 48 located at increments along the long rail 44 as desired for an intended application. Thus, the long rail system 18 allows for improved vehicle seat 14 position adjustment since the vehicle seat 14, coupled to at least one long rail drive assembly 40, is repositionable to any selectable position 46, 48 along at least one the fixed long rail 44. Further, the vehicle seat 14 can be detached from the long rail drive assemblies 40 and reattached to long rail drive assemblies 40', 40" within the same or different fixed long rails 44, 44'.

A perspective view of a portion of one of the long rails 44, including one of the long rail drive assemblies 40, is shown in FIG. 2. A perspective view of a position of the long rail 44 is shown in FIG. 3. The long rail 44 is an elongated component with a generally C-shape profile 49 in cross-section, having a bottom wall 50, a top wall 52, opposing right and left side walls 60, 64, an interior cavity 68, and an elongated opening 72 extending along the right side wall 60. The elongated opening 72, or striker slot 72, in the right side wall 60 includes opposing J-shaped lips 76, 84 with the elongated opening 72 extending there between. The striker slot 72 is preferably positioned on a vertical wall, such as the right side wall 60, to reduce the potential of accumulating debris in the long rail drive assembly 40 and within the interior cavity 68 of the long rail 44. The long rail 44 is a stamped, Ruined, molded, extruded and/or rolled section of a metal and/or plastic material having a length selected based on a specific application. While a generally C-shape profile 49 is illustrated in FIGS. 2 and 3, it should be appreciated that the size and shape may vary without altering the scope of the invention. The dimensions of the long rail 44, including the cross-sectional profile 49, are selected, in part, based on generally known engineering calculations, finite element analysis (FEA), and physical testing.

As also shown in FIG. 3, a gripping surface 90 is integrated with and/or attached to the left side wall 64 of the long rail 44. The gripping surface 90 comprises a plurality of generally vertical notches, bumps, slots, textured pattern, teeth and/or grooves 92 extending in a longitudinal direction. Alternatively, the gripping surface 90 may comprise any material with a surface friction greater than smooth metal such as plastic, silicon, rubber, a textured strip of metal, and/or combination of materials. While the gripping surface 90 is illustrated attached to the left side wall 64 of the long rail 44 in FIG. 3, it should be appreciated that the position and configuration of the gripping surface 90 may vary without altering the scope of the invention, including placement of the gripping surface 90 on or integrated with one or more of the bottom wall 50, the top wall 52, and/or right side wall 60 of the long rail 44. Preferably, the gripping surface 90 is located on an inner vertical surface of the long rail 44 to reduce the potential for debris to enter the long rail drive assembly 40. Further, the gripping surface 90 may be replaced by notches or protrusions in one or more of the left side wall 64, the top wall 52, the bottom wall 50, and/or the right side wall 60 of the long rail 44. The gripping surface 90 can be formed during a stamping and/or roll forming process when the long rail 44 is formed. Alternatively, the gripping surface 90 can comprise a spray-on material, a laminated feature, a weld-on feature, a heat-staked feature, mechanically fastened, and/or an adhered feature assembled with the long rail 44, as non-limiting examples.

The long rail 44 is assembled within a recess 94 in the vehicle floor 22 as illustrated by frame member 98, alternatively described as "body in white" or "BIW", as shown in FIG. 2. The recess 94 in the frame member 98 is a generally U-shaped recess 94 having a bottom wall 104, opposing right and left side walls 110, 110A, 118, and an elongated opening 124 extending between the opposing right and left side walls 110, 118. The distance between the opposing right and left side walls 110, 118 of the frame member 98 is generally greater than the distance 126 between the opposing right and left side walls 60, 64 of the long rail 44. The right side wall 110 of the frame member 98 forms a recessed track 130 adjacent the side wall portion 110A. While a generally U-shaped frame member 98 is illustrated in FIG. 2, it should be appreciated that the size and shape of the frame member 98 may vary without altering the scope of the invention.

As illustrated in FIG. 2, the long rail 44 is assembled with frame member 98 such that the left side wall 64 of the long rail 44 is positioned near and/or adjacent the left side wall 118 of the frame member 98. Further, the bottom wall 50 of the long rail 44 is positioned near and/or adjacent the bottom wall 104 of the frame member 98. There is a gap 134 between the right side wall 60 of the long rail 44 and the right side wall 110 of the frame member 98 since the distance between the right and left side walls 60, 64 of the long rail 44 is less than the distance between the right and left side walls 110, 118 of the frame member 98.

When the long rail drive assembly 40 is assembled with the long rail 44, as shown in FIG. 2, a main body portion 150 of the rail drive assembly 40 is generally contained within the interior cavity 68 of the long rail 44. The structure of the main body 150 of the rail drive assembly 40 will be discussed in more detail below in reference to FIGS. 7-17. One or more striker shafts 158, 160 extend generally horizontally from the main body portion 150 of the long rail drive assembly 40 and extend across at least a portion of the gap 134 between the right side wall 60 of the long rail 44 and the right side wall 110 of the frame member 98. A portion of each striker shaft 158, 160 extending across the gap 134 between the right side wall 60 of the long rail 44 and the right side wall 110 of the frame member 98 forms a striker 162, 164 (see FIG. 7).

A striker vertical support 166 is attached at one end 168 of each striker shaft 158, 160, as illustrated in FIG. 2. The striker vertical supports 166 reinforce the long rail drive assembly 40 during system event loading. The striker vertical supports 166 travel along the recessed track 130 in the right side wall 110, 110A of the frame member 98. The frame member 98 includes an inverted C-shaped bracket 174 positioned above the recessed track 130 in the frame member 98 and fixedly coupled to the right side wall 110A of the frame member 98 to form a channel 180 for the striker vertical supports 166. The inverted C-shaped bracket 174 laterally and/or vertically retains the striker vertical supports 166 within the channel 180 and further reduces the contamination and debris that can enter the channel 180. Contamination and debris entering the gap 134 between the long rail 44 side wall 60 and the frame member 98 side wall 110 will likely fall to the frame member 98 bottom wall 104. The recessed track 130 in the right side wall 110, 110A of the frame member 98 is spaced above the junction of the right side wall 110 and the bottom wall 104 of the frame member 98. The position of the recessed track 130 further reduces the amount of contamination and debris entering the channel 180 for the striker vertical supports 166.

Seat latch assemblies 192 releasably couple with a respective striker 162, 164 in the gap 134 between the right side wall 60 of the long rail 44 and the right side wall 110 of the frame member 98, as shown in FIG. 4A. While not shown in FIG. 4A, each seat latch assembly 192 is fixedly coupled with one of the legs 28, 32 of the vehicle seat 14. Thus, the vehicle seat 14 can be decoupled from the rail drive assembly 40 by decoupling the seat latch assemblies 192 from the respective striker 162, 164. Further, the vehicle seat 14 is coupled to the rail drive assembly 40 by reattaching the seat latch assemblies 192 to the respective striker 162, 164. When the vehicle seat 14 is coupled with the rail drive assembly 40, the rail drive assembly 40 can reposition the vehicle seat 14 along the long rail 44 in a forward F and a rearward R direction as illustrated by arrow 194 in FIG. 4A. FIG. 4B illustrates the rail drive assembly 40' transposed in the rearward R direction towards the second seat position 48 from the first seat position 46 shown in FIG. 4A.

While not shown in the Figures, a conventional loop latch, or any other generally known rail latching mechanism, is generally positioned between the front and rear strikers 162, 164 to selectively latch the long rail drive assembly 40 to the long rail 44 and prevent the long rail drive assembly 40 from changing position during system event loading.

The amount of contamination and debris entering the rail drive assembly 40 of the present invention is reduced over conventional long rail drive systems 218 such as shown in FIG. 5. Each side 220A, 220B of the prior art vehicle seat 14P is attached to a generally known carrier 228 that travels along an elongated slot 234 in a top wall 240 of a U-shaped rail 248. FIG. 6 shows a perspective view of the generally known carrier 228 and a section of the U-shaped rail 248. The U-shaped rail 248 includes a bottom wall 254, opposing left and right side walls 260, 266, and the top wall 240 having the elongated slot 234. Each of the left and right side walls 260, 266 includes a track 278, 286, also referred as a channel 278, 286, extending longitudinally along the U-shaped rail 248. The carrier 228 includes opposing pairs of wheels, rollers, and/or tabs (not shown) that travel along the tracks 278, 286. The generally known carrier 228 shown in FIG. 6 lacks a power driven system integrated within the U-shaped rail 248 to reposition the carrier 228 along the U-shaped rail 248. Further, the upwardly-orientated elongated slot 234 and the open cross-section of the lower channels 278, 286 allow contamination and debris to enter the U-shaped rail 248 that can affect the movement of the carrier 228.

In contrast to the conventional long rail drive system 218 shown in FIGS. 5 and 6, the long rail system 18 of the present invention reduces the amount of contamination and debris entering the rail drive assembly 40 since the rail drive assembly 40 is protected by the top wall 52 of the long rail 44. In the cutaway perspective view of the rail drive assembly 40 and a portion of the long rail 44 shown in FIG. 7, a double "J" reinforced bracket 298 extends between front and rear strikers 162, 164, providing strength to the rail drive assembly 40 and reducing the exposure of the rail drive assembly 40 to contamination and debris. The double "J" reinforced bracket 298 includes a generally planar and generally vertical main cover portion 304, Upper and lower edges 306, 308 of the main cover portion 304 terminate in opposing curved "J" channels 310, 312. The upper and lower "J" channels 310, 312 meshingly interlock with the J-shaped lips 76, 84 of the long rail 44 such that lateral and vertical motion of the double "J" bracket 298 is restricted by the J-shaped lips 76, 84 of the long rail 44. As shown in the cross-sectional view of the rail drive assembly 40, the long rail 44, and frame member 98 in FIG. 8, the upper and lower "J" channels 310, 312 may be spaced apart from the respective J-shaped lip 76, 84 during normal operation.

Figure 8:
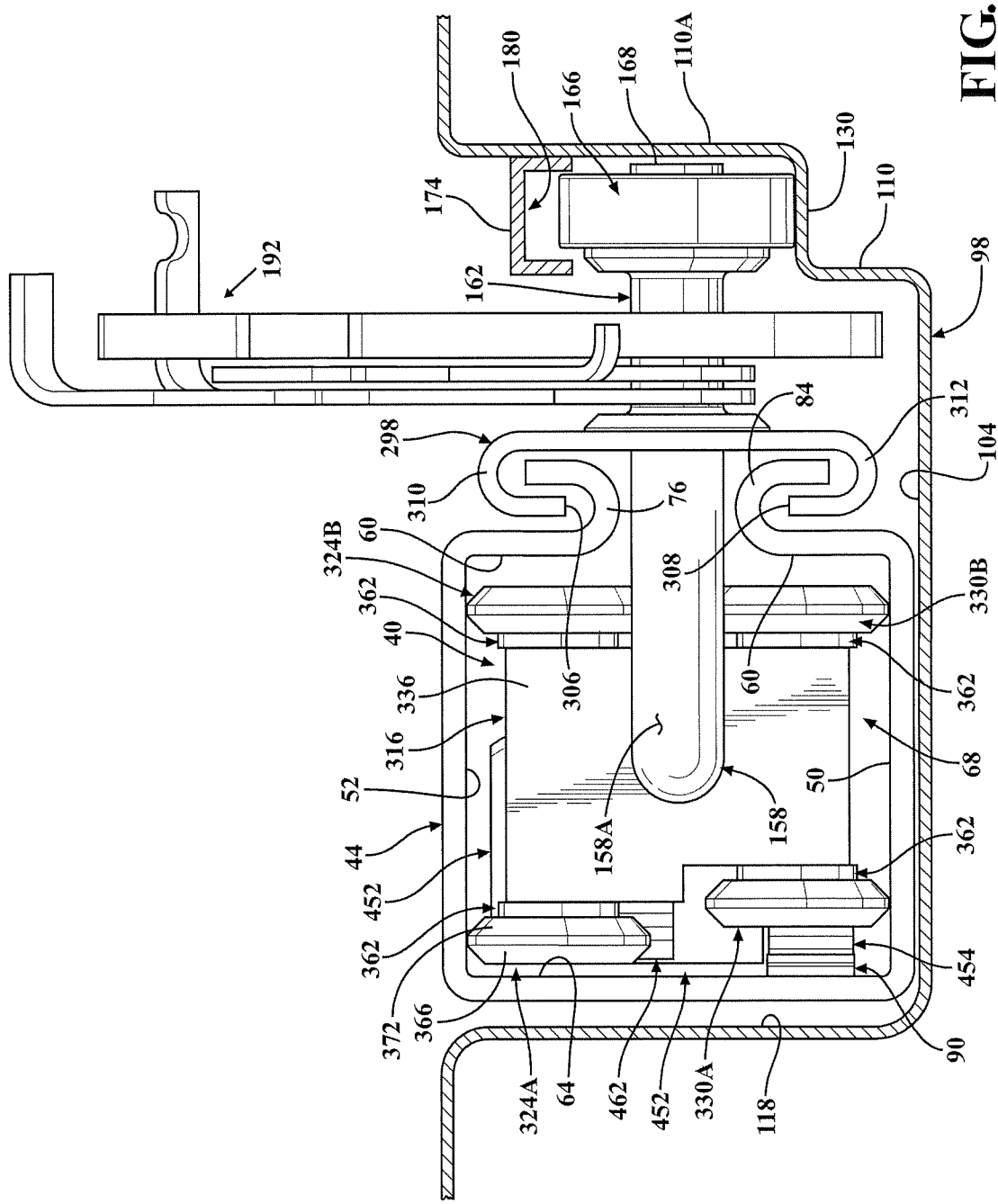
FIG. 8 is an end view of the portion of the long rail including the rail drive assembly and seat latch assemblies of FIG. 2 according to one embodiment of the present invention.

Returning to FIG. 7, the main body portion 150 of the rail drive assembly 40 includes a power rail drive module 314 supported between front and rear wheel carrier assemblies 316, 320. The striker shafts 158, 160 extend longitudinally from the wheel carrier assemblies 316, 320, bend at approximately a ninety degree angle such that the striker shafts 158, 160 have a laterally-extending portion 158A, and pass through the double "J" reinforced bracket 298 to form the strikers 162, 164 as illustrated in FIGS. 7 and 8. While the striker shafts 158, 160 are illustrated in FIG. 7 extending longitudinally away from the wheel carrier assemblies 316, 320 and transitioning to the laterally-orientated portions 158A to form the strikers 162, 164, it should be appreciated that the size and shape of the striker shafts 158, 160 and the strikers 162, 164 may vary, including directly extending laterally away from the wheel carrier assemblies 316, 320, without altering the scope of the invention.

Figure 9:
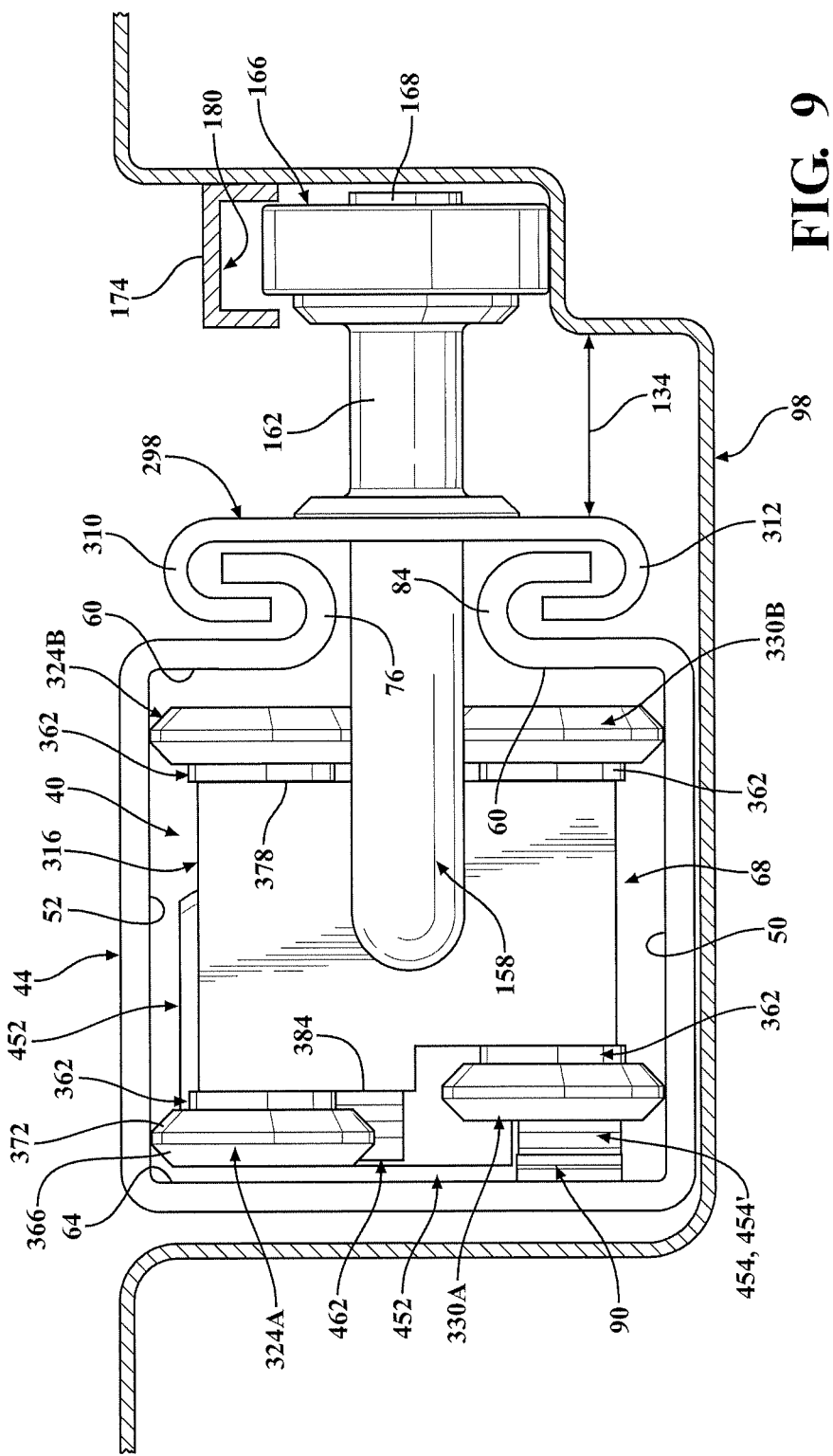
FIG. 9 is an end view of the portion of the long rail including the rail drive assembly of FIG. 8 with the seat latch assemblies removed from the rail drive assembly, according to one embodiment of the present invention.

An end view of the rail drive assembly 40, the long rail 44, the frame member 98, and the seat latch assembly 192 coupled to the striker 162 is shown in FIG. 8, according to one embodiment of the present invention. An end view of the rail drive assembly 40, the long rail 44, and the frame member 98 of FIG. 8 is shown in FIG. 9 with the seat latch assembly 192 decoupled from the striker 162. When the double "J" reinforced bracket 298 is assembled with the long rail 44, the rail drive assembly 40 is generally encased on the top 52, sides 60, 64, and bottom 50 by the long rail 44 and the double "J" reinforced bracket 298.

Figure 10:
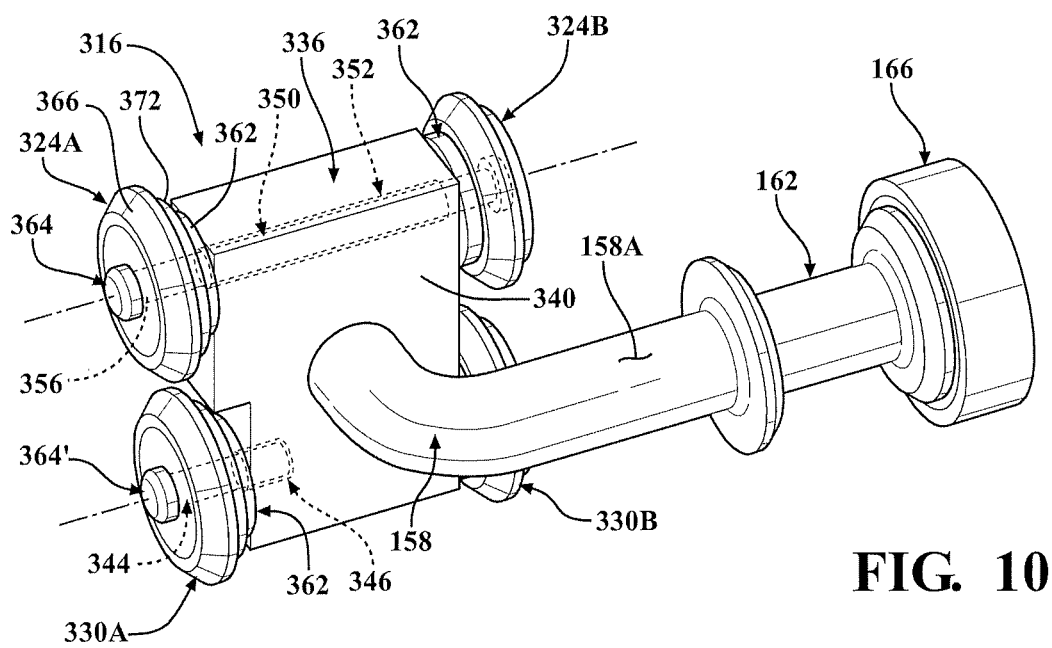
FIG. 10 is a perspective view of a wheel carrier assembly removed from the rail drive assembly of FIG. 9, according to an embodiment of the present invention.

Referring to FIGS. 9 and 10, each wheel carrier assembly 316, 320 includes a pair of upper and lower wheels 324A, 324B, 330A, 330B configured to travel along the interior cavity 68 of the long rail 44. FIG. 10 shows a perspective view of the wheel carrier assembly 316 and the striker shaft 158 of FIG. 9 removed from the rail drive assembly 40. Each wheel carrier assembly 316, 320 includes a wheel carrier main body 336 and the bent striker shaft 158 extending from a face surface 340 of the wheel carrier main body 336, passing through the double "J" reinforced bracket 298 to provide the striker 162, 164 for the seat latch assembly 192, and extending through the striker vertical support 166. Each wheel 324A, 324B, 330A, 330B can be attached to the wheel carrier main body 336 by a stud 344 inserted into a recess 346 such that the wheel 324A, 324B, 330A, 330B can rotate on the stud 344. Alternatively, an axle 350 can extend through a passageway 352 in the wheel carrier main body 336 with a wheel 324A, 324B, 330A, 330B mounted on each end 356 of the axle 350. Optionally, a bushing and/or a spacer 362 is positioned on the stud 344 (and/or the axle 350) between each wheel 324A, 324B, 330A, 330B and the wheel carrier main body 336. Lateral stability buttons 364 are optionally assembled with each wheel 324A, 324B, 330A, 330B to stabilize the position of the wheel carrier assembly 316 within the long rail 44. Alternatively, the stud 344 and/or the axle 350 may have a retaining feature 364' that forms the stability button 364 when assembled with the wheel 324A, 324B, 330A, 330B. While not shown in the Figures, the stud 344 may have a press-fit, snap-fit, or other mechanical fastening connection with the wheel carrier main body 336. Optionally, the wheel 324A, 324B, 330A, 330B and the bushing/spacer 362 are slid onto the stud 344 prior to the stud 344 being assembled with the wheel carrier main body 336.

While the wheels 324A, 324B, 330A, 330B are illustrated in FIGS. 9 and 10 having tapered inner and outer surfaces 366, 372, it should be appreciated that the size, shape, orientation, material composition, attachment method, and number of wheels 324A, 324B, 330A, 330B may vary without altering the scope of the invention. Any number of wheels 324A, 324B, 330A, 330B may be used on the wheel carrier main body 336. The wheels 324A, 324B, 330A, 330B may be mounted to the wheel carrier main body 336 using a fixed attachment method as shown in FIG. 10. While not shown in the Figures, the wheels 324A, 324B, 330A, 330B may be assembled with the wheel carrier main body 336 using a floating attachment and/or a spring-loaded attachment. Further, individual wheels 324A, 324B, 330A, 330B may be attached by one or more methods (fixed, spring-loaded, floating) on the wheel carrier main body 336, i.e., a pair of wheels 324A, 324B may be attached using a fixed attachment (similar to the attachment shown in FIG. 10) with the remaining wheels 330A, 330B being attached to the wheel carrier main body 336 by a floating and/or spring-loaded attachment method. The lateral stability buttons 364 may be a separate component, may be integrated with the stud 344 (and/or axle 350) and/or integrated with the wheel 324A, 324B, 330A, 330B, or may be omitted as desired for a specific application. Likewise, the bushing and/or spacer 362 may be a separate component, may be integrated with the wheel 324A, 324B, 330A, 330B and/or integrated with the wheel carrier main body 336, or may be omitted as desired for a specific application. The wheels 324A, 324B, 330A, 330B, bushings and/or spacers 362, stability buttons 364, studs 344 and/or axles 350, as well as the wheel carrier main bodies 336 can be formed from any one or combination of materials, including metal, plastic, rubber, and silicone, as non-limiting examples. Further, the wheels 324A, 324B, 330A, 330B, bushings and/or spacers 362, stability buttons 364, studs 344 and/or axles 350, as well as the wheel carrier main bodies 336 can be formed by one or more of a stamping process, machined, cast, and/or molded, as non-limiting examples and as suitable for an intended application and selected material.

As shown in FIG. 9, the wheel carrier main body 336 has a generally rectangular shape, though any other suitable shape may be used without altering the scope of the invention. The wheels 324B, 330B are shown generally aligned vertically on one side 378 of the wheel carrier main body 336 with the opposing side 384 of the wheel carrier main body 336 having wheels 324A, 330A laterally offset from each other. In particular, the lower wheel 330A assembled adjacent the gripping surface 90 is offset from the upper wheel 324A such that the lower wheel 330A does not contact the gripping surface 90 during normal operation.

Figure 11:
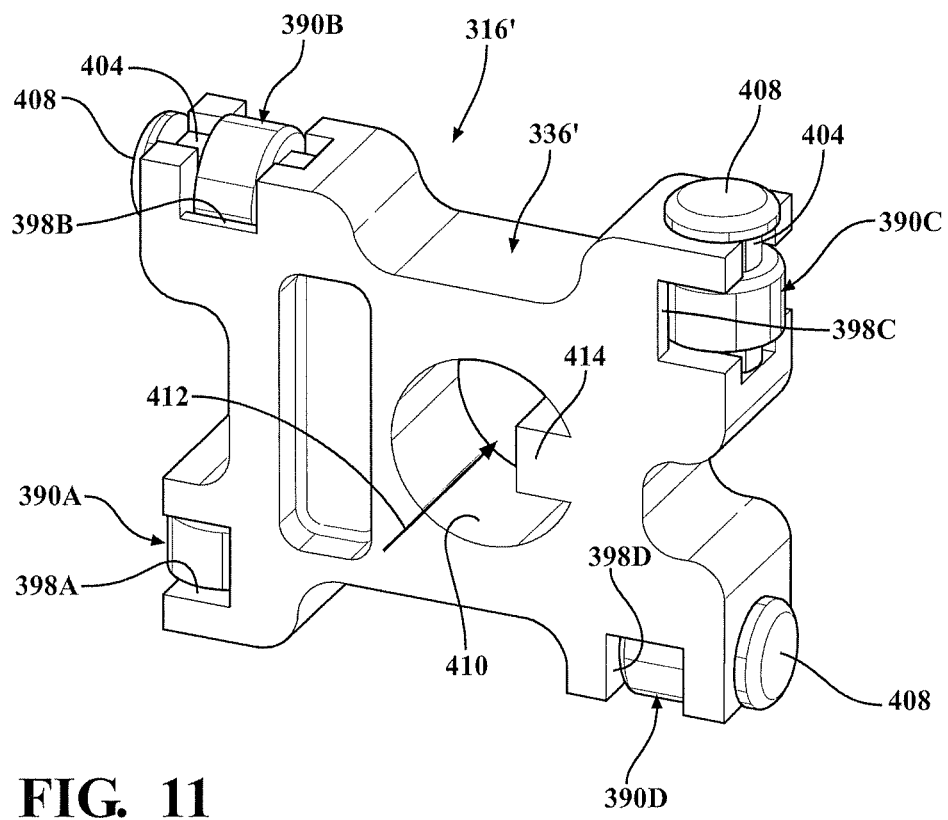
FIG. 11 is a perspective view of a wheel carrier assembly, according to a second embodiment of the present invention.

A second embodiment of a wheel carrier assembly 316' is shown in FIG. 11 prior to assembly with the striker shaft 158. The wheels 324A, 324B, 330A, 330B of FIG. 10 have been replaced by rollers 390A-390D mounted in a respective recess 398A-398D in a wheel carrier main body 336'. Each roller 390A-390D includes an axle 404. As shown in the embodiment of FIG. 11, the axle 404 of each roller 390A-390D can be orientated vertically, horizontally, and/or any suitable orientation. Optionally, the axles 404 of diagonally opposing rollers 390A, 390C and 390B, 390D can be orientated in the same direction. As shown in FIG. 11, the axles 404 of rollers 390A and 390C are orientated generally vertically, while the axles 404 of the rollers 390B and 390D are orientated generally horizontally. This arrangement of rollers 390A-390D stabilizes the wheel carrier assembly 316' laterally and vertically within the long rail 44. It should be appreciated that the number, relative position, shape, size, and orientation of rollers 390A-390D may vary without altering the scope of the invention. Further, each axle 404, and/or roller 390A-390D can include a lateral and/or vertical stability button 408 as shown in FIG. 11. Alternatively, while not shown in the Figures, stability button 408 features can be incorporated into the wheel carrier main body 336' or can be a separate component fixedly coupled to the wheel carrier main body 336'. As with the embodiment shown in FIG. 10, the rollers 390A-390D can similarly be fixedly attached to the wheel carrier main body 336', and/or coupled to the wheel carrier main body 336' with a floating and/or spring-loaded connection (not shown).

The wheel carrier assembly 316' shown in FIG. 11 includes a through hole 410 passing through the wheel carrier main body 336' forming a passageway 412 configured to matingly engage with the striker shaft 158. The through hole 410 includes a tab portion 414 extending into the passageway 412 configured to frictionally engage with a slot (not shown) in the striker shaft 158 to prevent rotation of the striker shaft 158 within the through hole 410. It should be appreciated that while a tab portion 414 is shown extending into the passageway 412 configured to prevent rotation of the striker shaft 158 after assembly, other generally known methods of mechanically joining the wheel carrier main body 336' and the striker shaft 158 may be used, including welding, snap-fit, keyway with a key, adhesive, clips, and mechanical fasteners, as non-limiting examples, without altering the scope of the invention.

Figure 12:
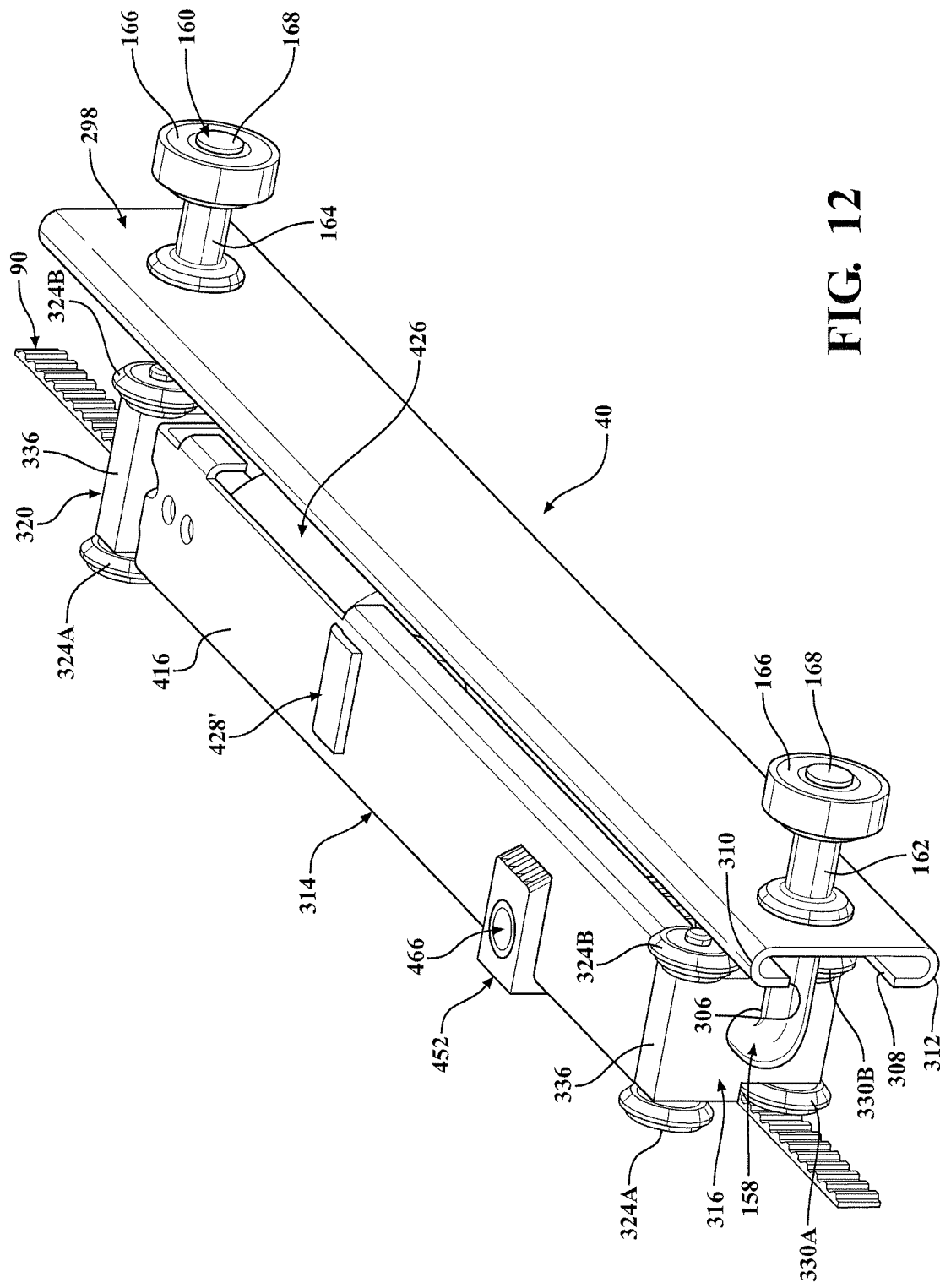
FIG. 12 is a perspective view of the rail drive assembly and gripping surface of FIG. 2 with the long rail omitted, according to an embodiment of the present invention.
Figure 13:
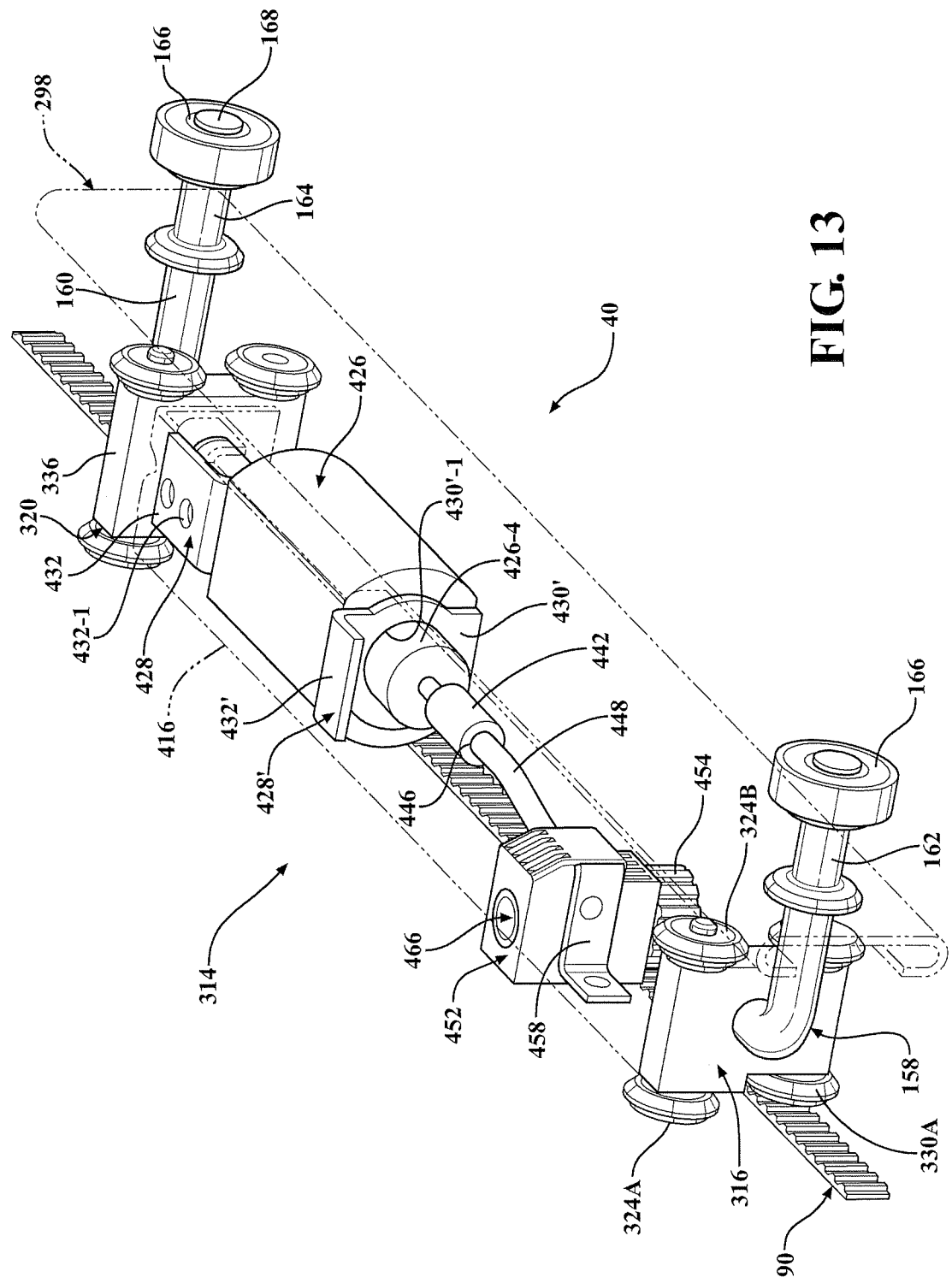
FIG. 13 is a cut-away perspective view of the rail drive assembly of FIG. 12 illustrating a power rail drive module within the rail drive assembly, according to an embodiment of the present invention.

Referring to FIG. 7, the rail drive assembly 40 includes the power rail drive module 314 supported between front and rear wheel carrier assemblies 316, 320. The power rail drive module 314 travels along the gripping surface 90 mounted to the left side wall 64 of the long rail 44. A perspective view of the rail drive assembly 40 and the gripping surface 90 of FIG. 7 is shown in FIG. 12 with the long rail 44 omitted. The rail drive assembly 40 includes the front and rear wheel carrier assemblies 316, 320 with each wheel carrier assembly 316, 320 having a striker shaft 158, 160 extending laterally from the rail drive assembly 40, through the double "J" reinforced bracket 298, and terminating with the striker vertical support 166. A mounting bracket 416 extends longitudinally between the wheel carrier assemblies 316, 320. A partial cutaway view of FIG. 12 is shown in FIG. 13 illustrating the power rail drive module 314 supported by the wheel carrier assemblies 316, 320. The power rail drive module 314 of FIG. 13 is shown in FIG. 14 prior to the power rail drive module 314 being assembled with the wheel carrier assemblies 316, 320.

Figure 14:
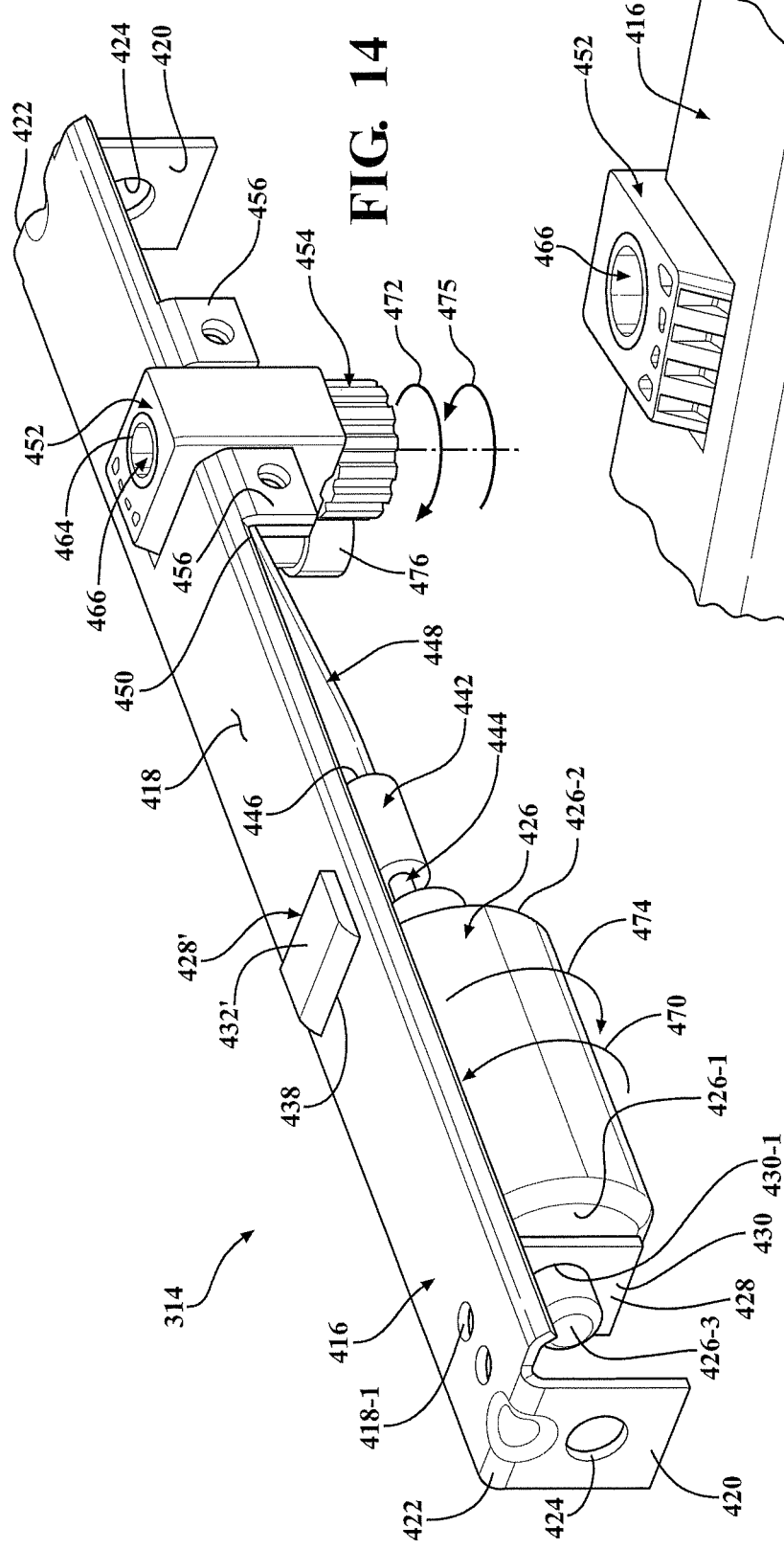
FIG. 14 is a perspective view of the power rail drive module of FIG. 13, according to an embodiment of the present invention.

The mounting bracket 416, shown in FIG. 14, is a generally U-shaped frame 416 having a generally planar mounting surface 418 with a bent tab 420 at each end 422 of the mounting surface 418. A wheel carrier assembly 316, 320 is attached to each tab 420 when the power rail drive module 314 is assembled with the wheel carrier assemblies 316, 320 to form the rail drive assembly 40. In the embodiment shown in FIG. 14, each tab 420 includes an aperture 424 for assembling the wheel carrier assembly 316, 320 with the mounting bracket 416 and optionally for assembling the tab 420 with a second end (not shown) of the striker shaft 158, 160.

Also shown in the embodiment of FIG. 14, the power rail drive module 314 includes an electric motor 426 supported on opposing ends 426-1, 426-2 of the motor 426 by generally L-shaped first and second motor attachment brackets 428, 428', each motor attachment bracket 428, 428' having a generally vertical first leg 430, 430' connected to a generally horizontal second leg 432, 432'.

An end portion 426-3 of the motor 426 is inserted through a passageway 430-1 in the first leg 430 of the first motor attachment bracket 428. An opposing end portion 426-4 of the motor 426 is inserted through a passageway 430'-1 in the first leg 430' of the second motor attachment bracket 428'. In the embodiment shown in FIG. 13, the second leg 432 of the first motor attachment bracket 428 includes a passageway 432-1 that generally aligns with a passageway 418-1 in the planar mounting surface 418 of the U-shaped frame 416 when the first motor attachment bracket 428 is assembled with the U-shaped frame 416. While not shown in the Figures, a mechanical fastener can be inserted through passageways 432-1 and 418-1 to mechanically fix the first motor attachment bracket 428 to the U-shaped frame 416.

The second leg 432' of the second motor attachment bracket 428', shown in FIGS. 13 and 14, is releasably coupled to the U-shaped frame 416 by inserting the second leg 432' through a slot 438 in the U-shaped frame 416. It should be appreciated that alternative generally known methods for fixedly coupling the motor attachment brackets 428, 428' to the U-shaped frame 416 may be used as desired for an intended application, including welding, crimping, snap-fit, adhesive, clips, and/or mechanical fasteners, as non-limiting examples, without altering the scope of the invention. Likewise, one and/or both motor attachment brackets 428, 428' can be integrated with the U-shaped frame 416, i.e., replacing one of the motor attachment brackets 428, 428' with a stamped and bent tab (not shown) projecting downward from the U-shaped frame 416. Any generally known method of attaching the motor 426 to the mounting bracket 416 suitable for a specific application may be used, non-limiting examples include mechanical fasteners, one or more brackets, clips, welds, crimping, adhesives, and similar fasteners, without altering the scope of the invention.

A drive shaft coupler 442 is fixedly coupled to a motor output shaft 444 extending from the electric motor 426 as illustrated in FIG. 14. The drive shaft coupler 442 connects the motor output shaft 444 to a first end 446 of a flexible drive shaft 448, also described as a "flex shaft" 448. The flex shaft 448 has a second end 450 operatively coupled to a drive wheel gear box 452. The flex shaft 448 allows the electric motor 426 to be positioned remotely from the drive wheel gear box 452. The drive wheel gear box 452 is operatively coupled to a drive wheel 454. The drive wheel 454 frictionally and/or meshingly engages with the gripping surface 90 as illustrated in FIG. 9 when the long rail drive assembly 40 is assembled with the long rail 44.

The drive wheel gearbox 452 is fixedly and/or releasably attached to gearbox mounting tabs 456 projecting from the mounting bracket 416 by a gearbox bracket 458 shown in FIG. 13. While not clearly shown in the Figures, the drive wheel gearbox 452 can be attached to the mounting bracket 416 by more than one gearbox bracket 458, as desired for an intended application. Any generally known method of fixedly and/or releasably attaching the gearbox bracket 458 and/or the drive wheel gearbox 452 to the gearbox mounting tabs 456 and/or to the mounting bracket 416, including omitting the gearbox bracket 458 by directly coupling the drive wheel gear box 452 to the mounting bracket 416 and/or integrating the drive wheel gearbox 452 and the mounting bracket 416, suitable for a desired application may be used, including mechanical fasteners, welding, crimping, adhesive, and interlocking tabs, as non-limiting examples.

Figure 15:
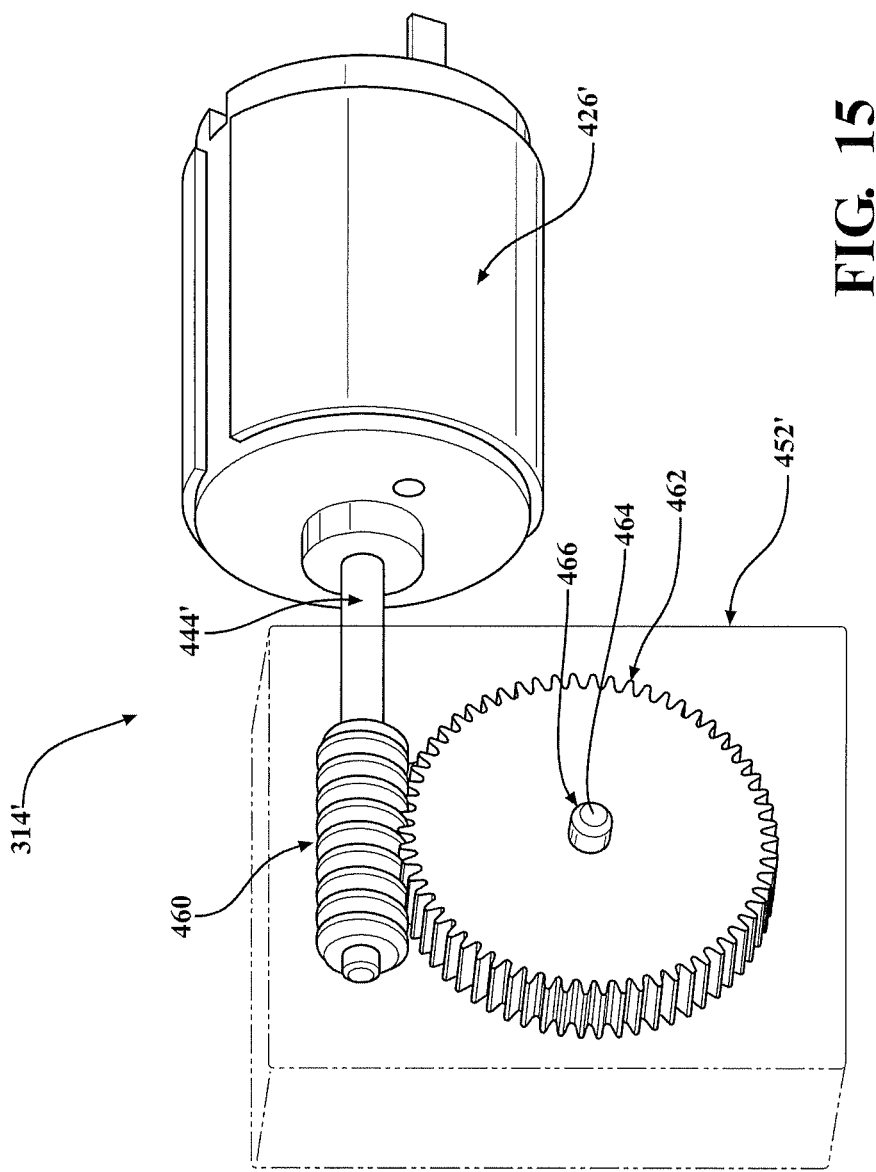
FIG. 15 is a top view of a power drive module, according to a second embodiment of the present invention.
Figure 16:
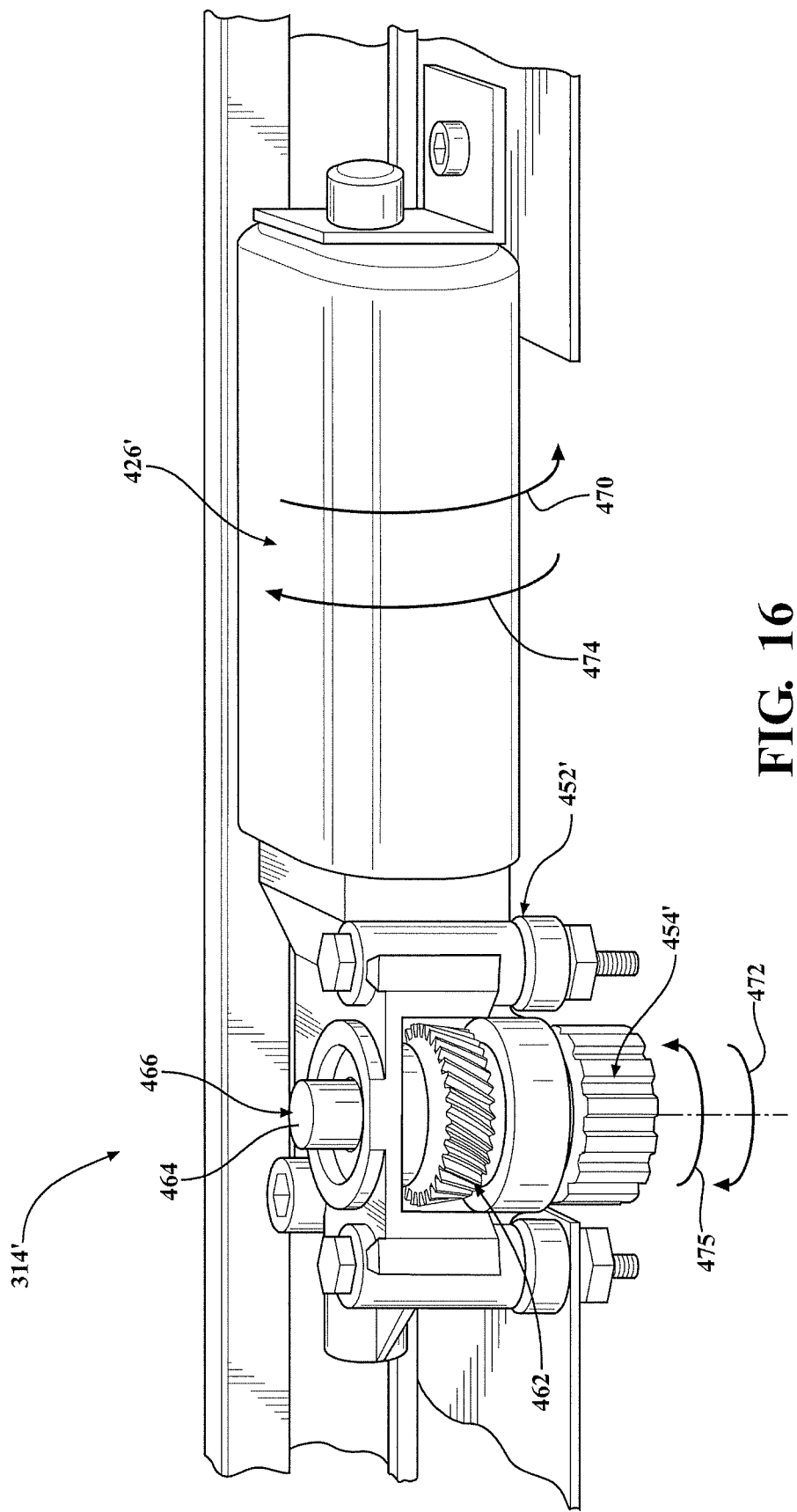
FIG. 16 is a perspective view of the power drive module of FIG. 15, according to the second embodiment of the present invention.

A power rail drive module 314', according to a second embodiment of the present invention, is illustrated in FIGS. 15 and 16. As in the first embodiment of the power rail drive module 314, an output shaft 444' of an electric motor 426' is operatively coupled to a drive wheel 454' through a drive wheel gearbox 452'. However, in the second embodiment, the output shaft 444' of the electric motor 426' is fixedly coupled to a drive gear 460.

As illustrated in FIG. 15, the drive wheel gearbox 452' includes a driven gear 462 fixedly coupled to one end 464 of a gearbox shaft 466. While not shown in the Figures, a second end of the gearbox shaft 466 is fixedly coupled to the drive wheel 454'. The drive gear 460 is meshingly engaged with the driven gear 462. It should be appreciated that the drive wheel gearbox configuration 452', electric motor 426' configuration, and operative connection between the electric motor 426' output shaft 444' and the drive wheel 454' may vary without altering the scope of the invention.

The drive wheel 454' is meshingly and/or frictionally engaged with the gripping surface 90 on the long rail 44 as illustrated in FIG. 9 when the long rail drive assembly 40 containing the power rail drive module 314' is assembled with the long rail 44. The engagement between the drive wheel 454' and the gripping surface 90 propels the rail drive assembly 40 along the long rail 44, and thus, moves the attached vehicle seat 14 along the long rail 44. When the electric motor 426' is energized in a first rotational direction 470, i.e. forward direction, the output shaft 444' is rotated in the first rotational direction 470, the drive gear 460 rotates the driven gear 462 and the drive wheel 454' in a first direction 472 causing the rail drive assembly 40 to travel along the long rail 44 in a forward direction F. Reversing the rotational direction 474 of the electric motor 426' reverses the rotation direction 475 of the drive gear 460, the driven gear 462, and the drive wheel 454', causing the rail drive assembly 40 to travel along the long rail 44 in a rearward direction R. It should be appreciated that the relationship between the directional rotation of the electric motor 426', the drive gear 460, the driven gear 462, the drive wheel 454', and the resulting relative forward and/reverse motion (F/R) of the rail drive assembly 40 along the long rail 44 is determined by the selected configuration and orientation of the various above referenced components. As such, relative rotational directions and motions may vary without altering the scope of the invention.

While not illustrated in the Figures, a third embodiment of the power rail drive module 314 includes an electric motor assembly 426 having internal gears and wherein an output shaft 444 of the electric motor assembly 426 is directly coupled to the drive wheel 454.

Referring to FIGS. 1, 4A, 4B, and 14, when it is desirable to reposition the vehicle seat 14 from one seating position 46 to the second seating position 48, the one or more long rail drive assemblies 40 operatively coupled to the vehicle seat 14 are activated by an input (not shown) from an occupant of the vehicle (not shown), such as actuation of an input button as a non-limiting example. When the long rail drive assembly 40 is activated, the loop latch (not shown) is disengaged from the long rail 44 such that the long rail drive assembly 40 can be repositioned with respect to the long rail 44. Once the loop latch is disengaged, power is supplied to the electric motor 426 to rotate the electric motor 426 output shaft 444 in one of the forward 470 and rearward 474 directions. Rotation of the electric motor 426 output shaft 444 causes rotation of the drive wheel 454 in the selected forward F or rearward R rearward directions. The rotation of the drive wheel 454 along the gripping surface 90 causes the long rail drive assembly 40 to travel in the selected direction. The user deactivates the input (i.e., releases a selector switch) once the vehicle seat 14 has translated to the desired seating position 48. The long rail drive assembly 40 is repositioned to the closest locking position (not shown) corresponding to the desired seating position 48 and the loop latch re-energizes to lock the long rail drive assembly 40 to the long rail 44. Once the long rail drive assembly 40 is locked to the long rail 44 (by engagement of the loop latch), the vehicle seat 14 is locked in the desired seating position 48.

Figure 17:
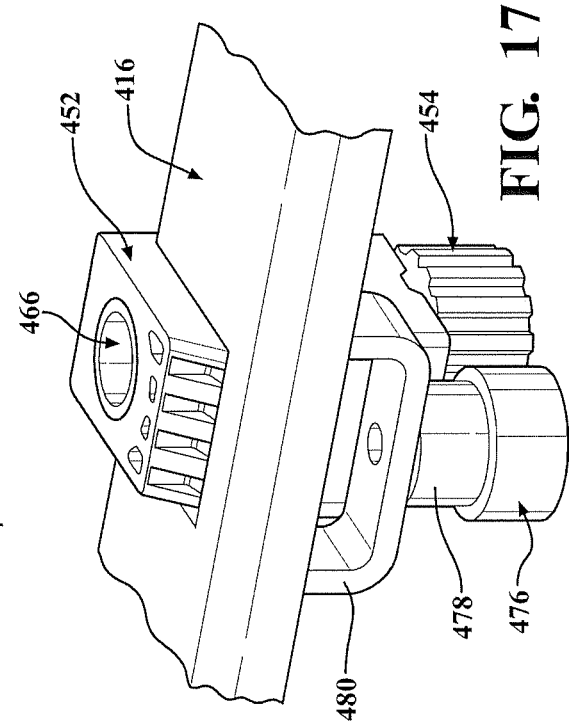
FIG. 17 is a perspective view of a portion of the power rail drive module of FIG. 14 illustrating a lateral support wheel, according to an embodiment of the present invention.

FIG. 17 shows a partial perspective view of the drive wheel gearbox 452 of FIG. 14 illustrating an optional lateral support wheel 476 fixedly and/or rotationally attached to a lateral support shaft 478. The lateral support shaft 478 is coupled to a U-shaped lateral support bracket 480. The lateral support bracket 480 is fixedly coupled to the mounting bracket 416. When the rail drive assembly 40 is assembled with the long rail 44, the lateral support wheel 476 travels along the long rail 44 adjacent and/or frictionally engaged with the right side wall 60 of the long rail 44 to restrict lateral movement of the rail drive assembly 40 within the long rail 44. While not shown in the Figures, it should be appreciated that the size, placement, and supporting structures of the lateral support wheel 476 may vary without altering the scope of the invention One benefit of a long rail assembly for vehicle seat adjustment having a fixed long rail with a side opening, a rail drive traveling within the long rail, and the rail drive having strikers extending away from the rail drive and through the side opening, is a reduction in the potential for contamination and debris entering the rail drive. A second benefit is a reduction in the potential for contamination and debris entering the long rail since the long rail lacks an upwardly-facing opening. A third benefit of the long rail assembly is the rail drive includes a power rail drive module configured to automatically transpose a vehicle seat along the long rail. A fourth benefit of the long rail assembly is the power rail drive module fits within the long rail where the drive module is substantially protected from contamination and debris entering the drive module.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A long rail assembly for transposing a vehicle seat longitudinally, said long rail assembly comprising:
   a fixed long rail having an elongated main body with a substantially C-shape profile in cross-section including a bottom wall, a top wall, opposing first and second side walls, an interior cavity, and an elongated opening extending longitudinally in said first side wall; and
   a rail drive assembly having a first striker extending away from said rail drive assembly, said rail drive assembly configured to be repositionable along said interior cavity of said fixed long rail with said first striker extending through said elongated opening in said first side wall of said long rail;
   wherein the vehicle seat is releasably coupled to said first striker, and wherein movement of said rail drive assembly along said long rail transposes the vehicle seat along said long rail;
   wherein said rail drive assembly includes a bracket through which said first striker extends, said bracket having a longitudinal length orientated generally parallel with a longitudinal axis of said rail drive assembly; and
   wherein said bracket is configured to substantially overlap said elongated opening in a portion of said long rail.

2. The long rail assembly as set forth in claim 1, wherein said rail drive assembly includes a second striker spaced apart from said first striker and extending away from said rail drive assembly; and
   wherein said second striker extends through said elongated opening in said long rail when said rail drive assembly is assembled with said long rail.

3. The long rail assembly as set forth in claim 2, wherein said first and second strikers extend through said bracket and said bracket substantially covers said elongated opening in said long rail between said first and second strikers.

4. The long rail assembly as set forth in claim 3, wherein said elongated opening in said long rail includes opposing upper and lower edges with each of said upper and lower edges forming J-shaped lips; and
   wherein said bracket includes upper and lower opposing edges, each of said upper and lower opposing edges forming J-shaped channels, said J-shaped channels configured to meshingly engage and/or overlap with said respective J-shaped lips when said rail drive assembly is assembled with said long rail such that said J-shaped channels can travel along said respective J-shaped lips when said rail drive assembly is transposed along said long rail.

5. The long rail assembly as set forth in claim 4, wherein said rail drive assembly includes a first wheel carrier assembly configured to travel along said interior cavity of said long rail.

6. The long rail assembly as set forth in claim 5, wherein said first striker is fixedly coupled to said first wheel carrier assembly.

7. The long rail assembly as set forth in claim 6, wherein said rail drive assembly includes a second wheel carrier assembly spaced apart from said first wheel carrier assembly, said second wheel carrier assembly configured to travel along said interior cavity of said long rail.

8. The long rail assembly as set forth in claim 7, wherein said rail drive assembly includes a power-driven rail drive assembled between said first and second wheel carrier assemblies.

9. The long rail assembly as set forth in claim 8, wherein each of said first and second wheel carrier assemblies comprise a wheel carrier main body having opposing first and second sides, opposing front and rear surfaces, and at least one wheel and/or roller rotationally coupled to each wheel carrier assembly.

10. The long rail assembly as set forth in claim 9, wherein each wheel carrier assembly includes said at least one wheel and/or roller rotationally coupled to each of said first and second sides of each wheel carrier assembly.

11. The long rail assembly as set forth in claim 10, wherein each of said at least one wheel and/or roller having a lateral stability button assembled with said at least one wheel and/or roller and/or with a shaft passing through an aperture in said at least one wheel and/or roller.

12. The long rail assembly as set forth in claim 11 wherein attachment of said at least one wheel and/or roller to each wheel carrier assembly is one or more of a fixed connection, a floating connection, and/or a spring-loaded connection.

13. The long rail assembly as set forth in claim 12, wherein a striker vertical support is fixedly and/or rotationally coupled with a distal end of each of said first and second strikers.

14. The long rail assembly as set forth in claim 13, wherein said power-driven rail drive includes an electric motor having an output shaft operatively coupled to a drive wheel; wherein rotation of said output shaft in a first rotational direction rotates said drive wheel in a first drive wheel rotational direction and wherein rotation of said output shaft in a second rotational direction reversed from said first rotational direction rotates said drive wheel in a second drive wheel rotational direction reversed from said first drive wheel rotational direction.

15. The long rail assembly as set forth in claim 14, wherein:
said long rail includes a gripping surface extending along an interior of said long rail;
said drive wheel frictionally and/or meshingly engage with said gripping surface when said rail drive assembly is assembled with said long rail;
rotation of said drive wheel in said first drive wheel rotational direction causes said rail drive assembly to be transposed along said long rail towards a forward end of said long rail; and
rotation of said drive wheel in said second drive wheel rotational direction causes said rail drive assembly to be transposed along said long rail towards a rearward end of said long rail.

16. The long rail assembly as set forth in claim 15, wherein: said power-driven rail drive includes a drive wheel gear box;
said drive wheel gear box including said drive wheel fixedly coupled to a first end of a gear box shaft and a driven gear fixedly coupled to a second end of said gear box shaft; and
said electric motor output shaft operatively coupled to a drive gear meshingly engaged with said driven gear such that rotation of said electric motor output shaft operatively rotates said drive gear, said driven gear, and said drive wheel.

17. The long rail assembly as set forth in claim 16, wherein said electric motor and said drive wheel gear box are fixedly coupled to a mounting bracket;
said first wheel carrier assembly is fixedly coupled to a first end of said mounting bracket; and
said second wheel carrier assembly is fixedly coupled to a second end of said mounting bracket.

18. The long rail assembly as set forth in claim 17, wherein:
said long rail assembly includes a frame member fixedly coupled to a vehicle floor, said frame member having a U-shaped main body extending in a longitudinal direction, said frame member having a bottom wall, opposing right and left side walls, and a track formed in said right side wall and extending in a longitudinal direction;
said long rail is assembled with said frame member such that said second side wall of said long rail is positioned adjacent said left side wall of said frame member and said bottom wall of said long rail is positioned adjacent said bottom wall of said frame member, and said rail drive assembly is positioned within said interior cavity in said long rail such that said first striker extends through said elongated opening in said long rail; and
when said rail drive assembly is transposed along a length of said long rail, said first striker travels along a length of said track.

19. The long rail assembly as set forth in claim 18, wherein: said gripping surface extending along said interior of said long rail comprises a spray-on material applied to an interior surface of said long rail, a molded feature fixedly coupled to said interior surface of said long rail, said gripping surface laminated onto said interior surface of said long rail, and/or a machined feature formed in said interior surface of said long rail during a stamping process and/or a roll forming process.

20. A method of transposing a vehicle seat along a fixed long rail fixedly coupled with a vehicle floor, the vehicle seat adapted to be releasably coupled to a rail drive assembly configured to travel along an interior cavity of the long rail between at least a first seating position and a second seating position, said method comprising:
providing said fixed long rail having an elongated main body having a C-shape profile in cross-section including a bottom wall, a top wall, opposing first and second side walls, an elongated opening extending longitudinally in said first side wall, and a gripping surface fixedly coupled to an interior surface of said second side wall and extending longitudinally along at least a portion of said long rail;
providing said rail drive assembly including: a power drive module coupled to at least one wheel carrier assembly, said power drive module including an electric motor operatively coupled to a drive wheel; a striker fixedly coupled to said at least one wheel carrier assembly and projecting away from said at least one wheel carrier assembly; and wherein said rail drive assembly is positioned within said interior cavity in said long rail with said striker projecting through said elongated opening in said first side wall of said long rail, said and drive wheel frictionally and/or meshingly engaged with said gripping surface;

energizing said electric motor in a first rotational direction such that said drive wheel is rotated in a first drive wheel direction;

rotating said drive wheel in said first drive wheel direction such that said rail drive assembly is transposed along said long rail towards said second seating position;

de-energizing said electric motor when said rail drive assembly arrives in said second seating position.

21. The method as set forth in claim 20, said method comprising:

energizing said electric motor in a second rotational direction reversed from said first rotational direction such that said drive wheel is rotated in a second drive wheel direction reversed from said first drive wheel direction;

rotating said drive wheel in said second drive wheel direction such that said rail drive assembly is transposed along said long rail towards said first seating position;

de-energizing said electric motor when said rail drive assembly arrives in said first seating position.

22. The method as set forth in claim 21, said method comprising:

providing a selectable input to said rail drive assembly, wherein said rail drive assembly is repositioned between one of said first and second seating positions and said other of said first and second seating positions in response to a signal received from said selectable input.

* * * * *